United States Patent
Angermeier et al.

(10) Patent No.: US 8,606,691 B1
(45) Date of Patent: Dec. 10, 2013

(54) SYSTEM, METHOD AND COMPUTER PROGRAM PRODUCT FOR DETERMINING LOAN PURCHASE ELIGIBILITY

(75) Inventors: Glenn V. Angermeier, Vienna, VA (US); James O. Holt, Vienna, VA (US)

(73) Assignee: Federal Home Loan Mortgage Corporation (Freddie Mac), Mclean, VA (US)

( * ) Notice: Subject to any disclaimer, the term of this patent is extended or adjusted under 35 U.S.C. 154(b) by 663 days.

(21) Appl. No.: 11/613,856

(22) Filed: Dec. 20, 2006

(51) Int. Cl.
*G06Q 40/00* (2012.01)

(52) U.S. Cl.
USPC .......... 705/38; 705/35; 705/36 R; 705/4; 705/39; 705/1.1

(58) Field of Classification Search
USPC .......... 705/1, 1.1, 38, 35, 4, 36 R, 39, 40, 2; 707/722, 769, 757; 235/379, 382
See application file for complete search history.

(56) References Cited

U.S. PATENT DOCUMENTS

| | | | |
|---|---|---|---|
| 5,819,230 A * | 10/1998 | Christie et al. | 705/4 |
| 6,088,686 A * | 7/2000 | Walker et al. | 705/38 |
| 6,799,174 B2 * | 9/2004 | Chipman et al. | 707/3 |
| 2004/0215555 A1 * | 10/2004 | Kemper et al. | 705/38 |
| 2004/0260576 A1 * | 12/2004 | Wang et al. | 705/2 |

* cited by examiner

*Primary Examiner* — John H Holly
(74) *Attorney, Agent, or Firm* — Oblon, Spivak, McClelland, Maier & Neustadt, L.L.P.

(57) ABSTRACT

A system, method and computer program product for determining purchase eligibility of a financial product; including, classifying the financial product according to an ontological model into one or more classification types, assigning a marker to each classification type corresponding to the attributes of the financial product, and applying decision one or more rules to the financial product to determine whether the financial product is eligible or ineligible for purchase or participation.

17 Claims, 6 Drawing Sheets

LOAN TYPE ATTRIBUTES

| LOAN TYPE PROPERTIES | BUSINESS NAME (BFM) | BUSINESS DEFINITION |
|---|---|---|
| has_borrower | Borrower Name | The name of the borrower |
| has_cashflows | Cash Flow Definition Name | A unique name for the type of cash flow definition. |
| has_collateral | Property Category Type | Specifies the type of dwelling or structure for the property. |
| has_constructionmethod_type | Property Dwelling Construction Method Type | Specifies the extent to which construction was performed on-site at the subject property. The construction method has implications for how stationary the dwelling is. |
| has_DPI_ratio | Total Debt Expense Ratio Percent | The ratio of all debt payments of the borrowers, including proposed housing expenses, to the qualifying income of the borrowers, AKA, back end ratio. |
| has_feature | Loan Feature Code | A code that describes features associated with a Mortgage. |
| has_HTLTV_ratio | HELOC Total Loan-to-value Ratio | The HTLTV is obtained by dividing the sum of the First Lien Mortgage amount and the totla HELOC credit line limit and any other secondary financing by value, as defined in Section 23.1 |
| has_lien_position | Mortgage Lien Position | Specifies the priority of the lien associated with the mortgage loan. this priority is relative to other liens against the subject property. |
| has_LTV_ratio | Current LTV Ratio Percent | The Unpaid Principal Balance (UPB) divided by the most recent value of the subject property. |
| has_maturity_Term | Loan Original Maturity Term Months Count | The scheduled number of months after which a debt will mature. |
| has_MI_loss_coverage | Mortgage Insurance Coverage Level Type | Categorizes the level of mortgage insurance coverage relative to the Guide and Freddie Mac's charter requirements. |
| has_risk_classification | Loan Prospector Credit Risk Classification Type | To convey the LP credit risk Classification. |
| has_TLTV_ratio | Total Loan-to-value ratio | The TLTV ratio is obtained by dividing the sum of the First Lien Mortgage amount and the disbursed amount of the HELOC and any other secondary financing by value, as defined in Section 23.1 |
| has_unpaid_balance | UPB Amount | The current unpaid principal balance on the loan. |
| has_appraised_value | Property Appraised Value Amount | Statement of property's value from a valid property valuation source. |
| has_mortgage_insurance | Mortgage Insurance Company Name | The name of the Mortgage Insurance Company. |

*Fig. 4*

SYSTEM, METHOD AND COMPUTER PROGRAM PRODUCT FOR DETERMINING LOAN PURCHASE ELIGIBILITY

BACKGROUND OF THE INVENTION

1. Field of the Invention

The invention relates generally to determining whether a financial product is eligible for purchase under the terms of business of one or more agreements between the parties to a transaction, and more particularly to the use of an ontological model to facilitate such a determination.

2. Description of the Related Art

Many companies engage in the business of purchasing financial products and assets such as loans. Freddie Mac is one such company and engages primarily in the purchase of home mortgage loans. Often, such purchases are made pursuant to agreements between the parties to the transaction, agreements which control not only the relationship between the parties and their duties and responsibilities but also dictate key terms of the transaction. Specifically, the terms of business contained in the agreements dictate the characteristics a loan must have to be deemed eligible for purchase. Loan characteristics used in such agreements to determine purchase eligibility include, for example: original loan amount, occupancy type, loan purpose, property type, maturity term, and indicator score.

Multiple agreements may be applicable for a given transaction. For example, in the case of home mortgage loan purchases by Freddie Mac, a master agreement known as a Seller/Servicer Guide governs transactions between Freddie Mac and a plurality of lenders. In addition, individual lenders who sell to Freddie Mac may enter into negotiated agreements that change, in some way, the terms of business contained in the master agreement. Accordingly, in order to accurately determine loan purchase eligibility from such lenders, terms of business contained in both the master agreement and the negotiated agreements would need to be considered.

Due to a number of factors, incorrect determinations are sometimes made regarding the purchase eligibility of a loan. That is, due to the large number of terms of business and their intertwined nature, the effects of which are difficult to assess, loans may be allowed to be purchased that should not be eligible. Conversely, loans may be prevented from being purchased due to erroneous determination of ineligibility. Either scenario would have negative financial consequences for the prospective purchaser of the loan. Further complicating the analysis is the fact that the terms of business change over time, often quite frequently. Such changes, if not effected in the analysis, will result in similar discrepancies and consequences.

An additional drawback inherent in current systems is the labor intensive nature of translating terms of business contained in the master and negotiated agreements into business rules that can be used by automated tools to help determine purchase eligibility. These terms of business are often drafted in legally complex language and, as mentioned above, are often intertwined. It is not uncommon for errors to be made in the translation of such terms of business into business rules with mathematical and logical operators for use in an automated process. That the terms of business may not be static and may in fact change many times in a year further complicates the process and requires additional resources to maintain the accuracy of the systems. The introduction of a new purchase eligible loan type into such an environment creates similar difficulties and is labor intensive, thereby extending the "time to market" for such a product.

Even when, under the current systems, the purchase eligibility of a loan is determined accurately, it is difficult to trace that determination back to the specific relevant terms of business used to determine eligibility. Specifically, in the case of loans determined to be ineligible, it is particularly useful to have additional visibility and traceability to the terms of business in the master agreement and/or the negotiated agreement that caused the loan to be deemed ineligible for purchase.

SUMMARY OF THE INVENTION

Accordingly, to address the above-mentioned and other problems of conventional systems, one object of the invention is to provide a system, method and computer program product for supporting and making an investment decision. An exemplary embodiment of the invention facilitates the analysis of a financial product and provides a means of determining whether the financial product, such as a loan, is eligible to be purchased under existing business agreements. The analysis is carried out by classifying the financial product according to its attributes to identify one or more classification types describing the financial product and then comparing the classification types to a set of criteria and/or decision rules. In an exemplary embodiment, the invention permits an automated and detailed decision process to be carried out on any asset considered for purchase and may optionally permit the decision criteria used to analyze each financial product or asset to be associated with an electronic record of the purchase eligibility decision for later auditing or tracing. The classification type could also be associated with an electronic record for later use.

In one embodiment, the invention is carried out with a process, system or a computer program product that includes receiving a data representation of a financial product, such as a loan, the data representation containing a plurality of attributes, classifying the data representation of the loan according to an ontological model into one or more classification types, where the ontological model represents a hierarchical organization of a plurality of classification types, assigning a marker to the classification types based on the terms of business of a negotiated agreement or a master agreement, then applying one or more decision rules to determine whether the loan is eligible or ineligible for purchase and marking the loan as eligible for purchase if the decision rule(s) is met.

The above summary addresses only selected aspects of the invention and should not be construed as a comprehensive description of all aspects of the invention, especially not at the exclusion of the teachings in the specification, claims and figures provided herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an abbreviated table of loan type attributes that may be used to at least partially characterize a loan.

DETAILED DESCRIPTION OF THE PREFERRED EMBODIMENTS

Figure 1:
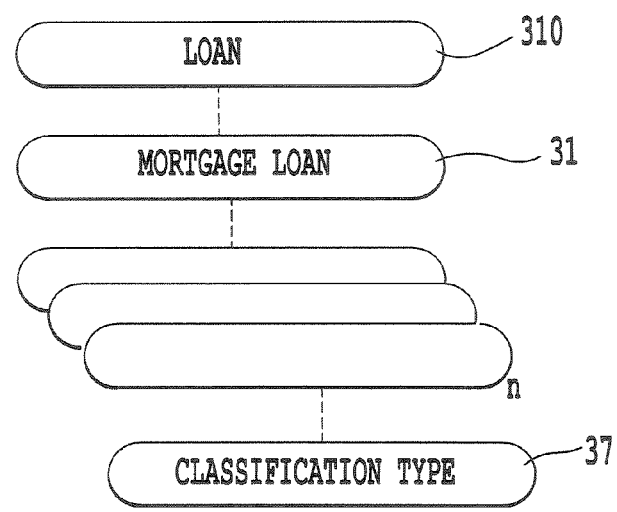
FIG. 1 is a classification ontology including levels of classification types.

A financial product, as the term is used herein, includes but is not limited to: a bond, a security (such as a mortgage-backed security), a debt obligation and an investment opportunity.

The term "eligible" as it is used herein indicates that a financial product is acceptable for purchase or participation according to the criteria of a financial institution that devised one or more classification types and/or an ontological model to describe the financial product. A particular financial product may be eligible if all of its attributes, features, and characteristics fall within one or more classification types defined by an ontological model and identified as allowable or eligible, e.g., by the investor or purchaser in advance. In certain circumstances, a financial product may be eligible for purchase even if it fails one or more explicit criteria. Such circumstances include, for example, cases in which an ineligible loan is specially identified as eligible and cases where special criteria override certain ineligible determinations.

The term "ineligible" as it used herein indicates that a financial product under consideration for purchase or participation is not acceptable for purchase or participation. A particular financial product may be ineligible if one or more of its attributes, features and/or characteristics do not meet the allowable ranges/values, characteristics, and/or any criteria defined for any portion of one or more classification types that describe the financial product (e.g., data representation) according to the ontological model.

The term "not indicated" as it used herein indicates that insufficient information and/or criteria for making an eligibility determination are available. A particular financial product may be characterized as not indicated if, for example, it is not possible to characterize the financial product according to an ontological model and/or if the financial product does not have any classification types matching with those of an ontological used to characterize the financial product (e.g., the attributes, features and/or characteristics of the financial product have not yet been modeled, characterized, identified, or mapped in, e.g., an ontological). In certain circumstances, a financial product may be eligible for purchase even if it is initially identified as not indicated or cannot be classified according to an ontological model. For example, a process may include a step or steps of assigning a special ontological model that is used to characterize the financial product and determine the eligibility of the financial product. Further, in certain circumstances, a financial product that is determined to be not indicated may be determined by special circumstances to be eligible or ineligible, for example, if special overriding criteria are assigned to one or more features and/or classifications types of the financial product.

A financial product may be classified in a variety of overlapping and/or distinct ways. For example, a financial product may be classified by its attributes, properties, components, characteristics and/or by the way such characteristics relate to the characteristics of a different financial product. An ontological model provides a way of organizing the properties (e.g., characteristics, features and attributes) of a financial product in a manner that relates the financial product's individual characteristics to a hierarchical organization of interrelated financial characteristics and/or features (e.g., classification types).

An ontological model may describe a financial product according to the financial product's attributes (e.g., the financial product's characteristics and/or properties), or by the way the attributes of the financial product relate to one another. For example, an ontological model may be a multi-branched and hierarchical description of the financial product's characteristics. In one aspect of the invention, a financial product is classified by one or more classification types that are part of an ontological model. In another aspect of the invention, the financial product may be classified according to the associations between the attributes of the financial product (e.g., the financial product is classified by its position within an ontological model relative to other financial products or by the manner in which the financial product's attributes are interrelated). In either case the financial product is classified according to an ontological model by virtue of classification types defined by a model that includes a map of hierarchically interrelated classification types that encompass the attributes of the financial product.

A complete ontological model may be prepared for any financial product by identifying the attributes and the classification types needed to describe the financial product and arranging them hierarchically. Optionally, these criteria may be mapped and/or associated with certain guides or sets of criteria that define limits of allowable ranges and/or pass/fail indicators such as markers.

In one representation, an ontological model may include many levels arranged hierarchically. An ontological model may provide a high-level description of a financial product by classifying the financial product by descriptors commonly used in the financial industry. For example, a financial product may be classified as a bond, asset-backed security, unsecured loan, etc. Such high level descriptions (e.g., classification types) are one way to at least partially characterize a financial product according to an ontological model.

Each of the aforementioned high-level classification types may be further defined by any number of sub-classification types. For example, an asset-backed security may be divided into a further level of classification types that further define the security, such as collateralized mortgage obligations (CMO), inventory-backed securities, receivable-backed securities, credit card receivable-backed securities, home equity loans, etc. Each family or sub-family represents a classification type that may optionally be further characterized according to the ontological model based on other classification types that, for example, describe the inherent attributes, properties, or conditions of the security, or the conditions under which the loan was marketed, originated, and/or sold.

For a collateralized mortgage obligation, an ontological model may include such classification types as loan-to-value ratio (LTV), underwriting risk rating, property type, credit characteristics of the borrower, type of collateralized mortgage obligation, type of inventory-backed security, type of receivable-backed security, type of credit card receivable-backed security, type of home equity loan, etc. Each of these attributes (e.g., characteristics) may be further described in terms of other sub-families representing further classification types depending on the depth of detail available and/or desired for the particular loan or any particular loan transaction.

An ontological model may be a proprietary model that is not shared amongst different and potentially competing entities. An ontological model may be one that a particular financial institution has structured and/or mapped to match the financial institution's methods of business. An ontological model, even a proprietary ontological model, may have much in common with industry-standard representations of asset-backed securities. For example, the financial market for home loans, such as the secondary home loan market, has well-defined standards for representing certain loans. The data representations that are used to describe such loans are typically standardized electronic forms. These standards function in one aspect to permit the easy transfer of loans and/or loan information between different financial institutions.

The standards are often prepared as forms that encode certain information to specific fields. Such standardized forms include the Freddie Mac Form 11, Freddie Mac Form 16 and MISMO forms. In some cases, a standard data representation of a loan may also be used to define the data structure (e.g., the data representation) by which a financial product such as a home loan is represented electronically to thereby facilitate the transfer of loan information between different parties. While standard forms and data representations may include much raw data describing a loan, including, e.g., loan attributes, the forms do not present the data in a purely ontological form that may be used to effectively classify a loan or security by its attributes.

One way to prepare an ontological model is by using a software tool such as PROTÉGÉ available as a third party open source program. The ontological model may be created using other techniques including manually mapping the classification types. One of skill in the art will know that other methods that result in a hierarchically organized model may also be used to prepare an ontological model.

A portion of an ontological model for a home loan is provided as FIG. 1. The ontological model begins by identifying the financial product as a loan 310. The classification types of the ontological model of FIG. 1 correspond with the loan's attributes, (e.g., the loan's features and characteristics). Any particular attribute may be encompassed by one or more classification types by which the ontological model ultimately organizes and/or represents the loan.

The loan of FIG. 1 is further characterized in another level as a mortgage loan 31. Many other attribute characterizations may exist in addition to the classification types shown as classification types of FIG. 1. For example, in addition to the classification type Mortgage Loan on the second level of the ontological model of FIG. 1, many other loan products could be included in "n" other levels of the ontological model. Such classification types (e.g., families or sub-families) may describe any number characteristics and could include, for example, home equity loan or other loans that are not commonly defined as a mortgage loan.

The ontological model of FIG. 1 continues to classify the collateralized mortgage obligation in sequentially lower levels (e.g., down the hierarchy) by a further series of classification types that eventually terminate 37 at the bottom of FIG. 1. There is no reason that the ontological model must terminate as shown in FIG. 1. Further classification types may be added for other attributes, characteristics, components and/or properties of the loan.

FIG. 1 provides a high level overview of a portion of one example of an ontological model. The ontological model of FIG. 1 is not limiting of ontological models for other financial products. Ontological models can be prepared for almost any financial product, financial obligation, asset, or investment opportunity.

Further portions of an ontological model can readily be assembled and/or devised by a person familiar with the characteristics of financial products including, for example, loans, collateralized mortgage obligations, assets, debt securities etc., and a particular financial institution's needs with respect to the information needed to classify and/or characterize the financial institution's assets, investment opportunities or products, to thereby permit simplified and/or automated analysis of the financial product.

Figure 2A:
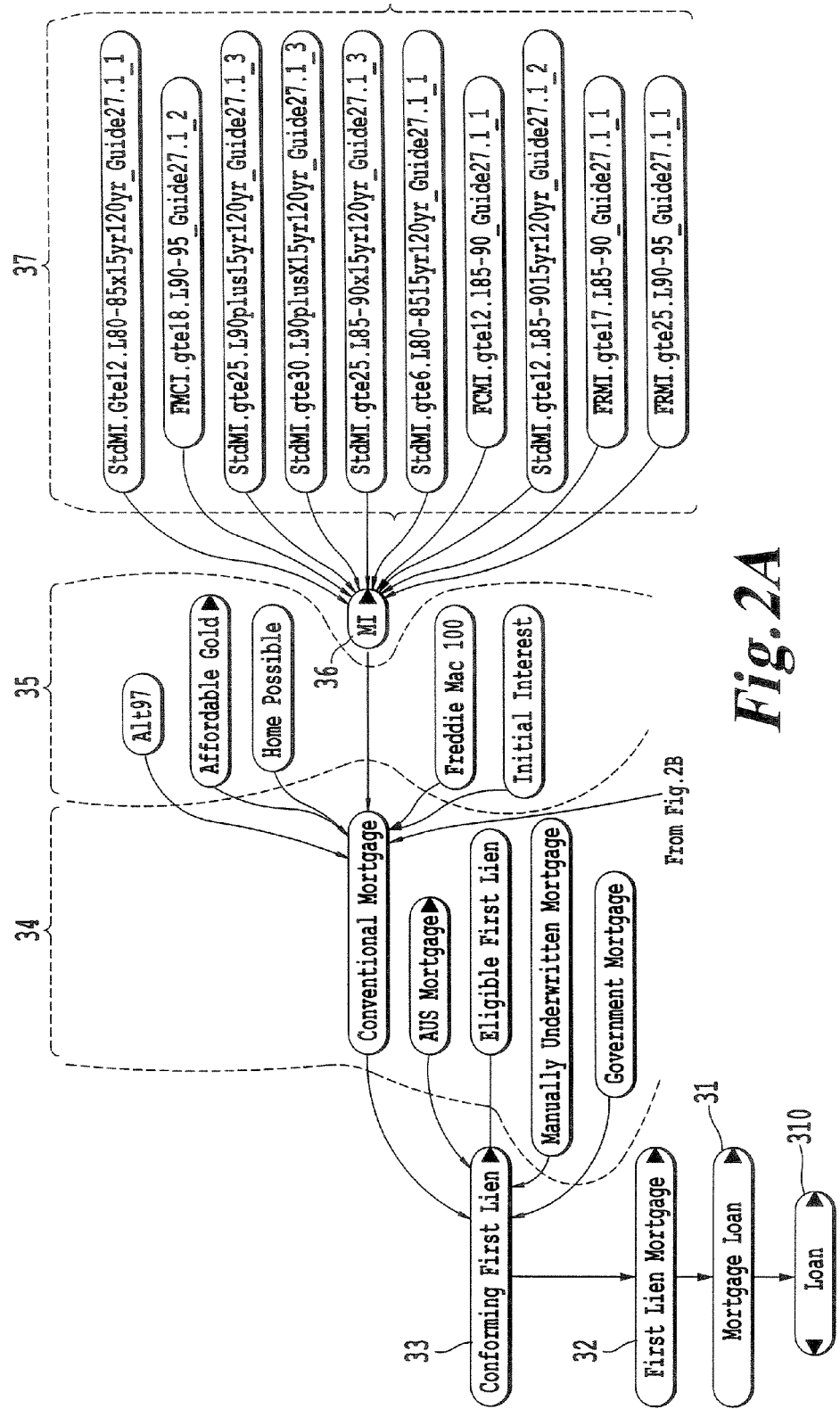
FIG. 2A is a portion of an ontological model.

The exemplary ontological model shown in FIG. 1 is only a portion of a larger model. A more detailed but still incomplete ontological model is shown in FIGS. 2A and B. A financial product classified according to the ontological model of FIG. 2A is first classified within the classification type of financial products of loans (310). In a next level of classifying, the loan is further classified within the classification type of mortgage loans (31). The mortgage loan is then classified by its lien features beginning with the loan's superiority (32) and, a next level of classifying is based on whether the loan is conforming (33). A conforming loan is one in which the loan amount is less than a predetermined maximum loan size limit. Of course, each of the aforementioned classifications is only a single classification type of a hierarchically organized family of classification types each representing certain attributes, features or characteristics of the loan.

The level of classifying shown as Conforming First Lien in FIG. 2A (33) may be further classified according to the type of conforming first lien (34). FIG. 2A includes classification types for Conventional Mortgage, AUS Mortgage, Eligible First Lien, Manually Underwritten Mortgage, and Government Mortgage, as examples, each of which may represent a different family of loan types within the classification of Conforming First Lien (33). The family of conventional mortgages can be represented by a next level of classification type that includes certain types of conventional loans (35).

Figure 2B:
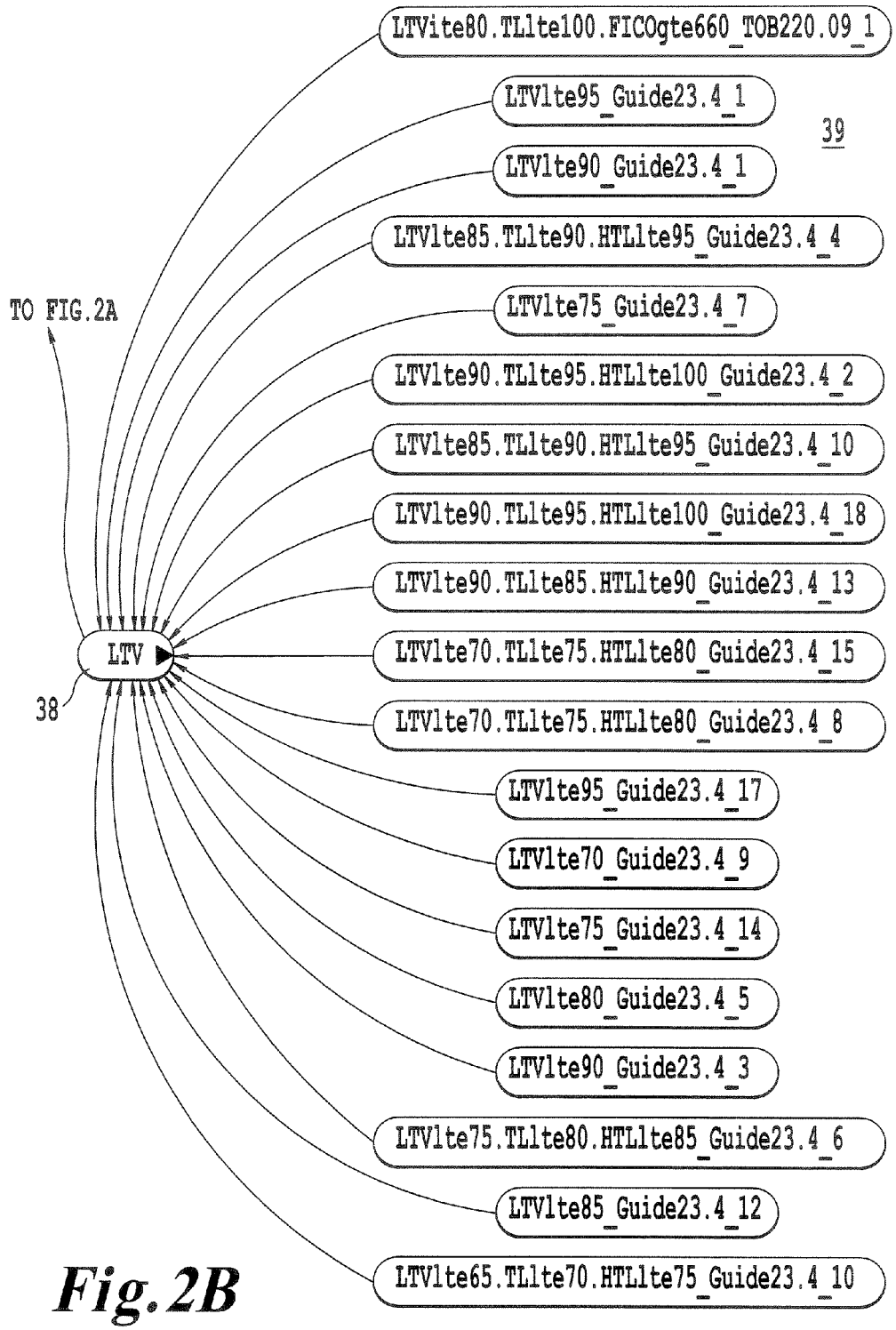
FIG. 2B is a portion of an ontological model.

In the second to the last level of classification types of the ontological model shown in FIGS. 2A and 2B, two attributes of conventional loans are used to characterize the financial product, LTV (loan to value ratio) (38) and MI (mortgage insurance) (36). These two attributes may encompass a number of classification types that form the basis for determining whether a loan is eligible for purchase. For example, a conventional loan may be eligible if the values for the classification types belonging to LTV of FIG. 2B (39) are within an allowable range defined by preset value or by certain agreements defined by the purchaser in advance (assuming that the values associate with any other classification types of the loan are also identified as allowable).

For the LTV classification types shown in FIG. 2B (39), a variety of guides such as negotiated agreements and/or a master agreement may define the allowable loan values. A guide may contain allowable ranges for a variety of loan information such as equity value, etc. For example, the classification type "LTVite70_Guide23.4_9" may contain all or a portion of the criteria which define the eligibility of a conventional mortgage. Such criteria may include threshold values and/or ranges for any data field of a data representation or derivative of one or more data field of a data representation of, e.g., a conventional mortgage. Preferably the threshold values and/or ranges are allowable values and/or ranges defined by the terms of business in a negotiated agreement or a master agreement.

Thus, FIGS. 2A and 2B show how a financial product can be represented by the hierarchically organized classification types of an ontological model. The classification types may, in turn, be mapped or associated with a set of allowable loan criteria and/or assigned predetermined eligibility definitions or markers. The allowable loan criteria may correspond with, for example, guides that define ranges of acceptable values for certain attributes and/or characteristics of the financial product.

In one embodiment of the invention, a financial product in the form of a data representation is first classified according to an ontological model to identify one or more classification types that correspond to the financial product and which may be used to compare the financial product with a model financial product, and/or identify whether the financial product is eligible for purchase.

The financial product may be classified according to an ontological model to thereby permit a financial institution to streamline the decision making process of determining whether to purchase a particular security and/or participate in a particular investment. In this aspect, an investment under consideration is first subjected to classifying. The classifying may characterize a financial product such as a CMO by its attributes according to an ontological model that may be a proprietary model or a standard model. The ontological model takes each available attribute of the security, investment, and/or financial product and classifies it according to one or more classification types defined by an ontological model, to thereby define the financial product.

The financial product is first received in the form of an electronic data representation that is easily transferable between financial institutions by electronic means, for example, over the Internet or by electronic data interface (EDI). A financial product is typically already defined by a series of attributes by the fields of a database. The fields of the database may be mapped and/or matched to certain classification types within the ontological model. Thus, translation from a standardized electronic form, to a data format used by an ontological model may be carried out electronically using a processor by comparing and/or classifying the values of the fields of the data representation according to the ontological model.

After the financial product is classified according to the ontological model, the resulting group of classification types is analyzed against decision rules and/or a set of eligibility criteria that define whether or not the financial product is eligible for purchase, and/or eligible or financially desirable for participation by an investor, or are otherwise checked for eligibility such as a preset eligibility, if assigned.

Figure 3:
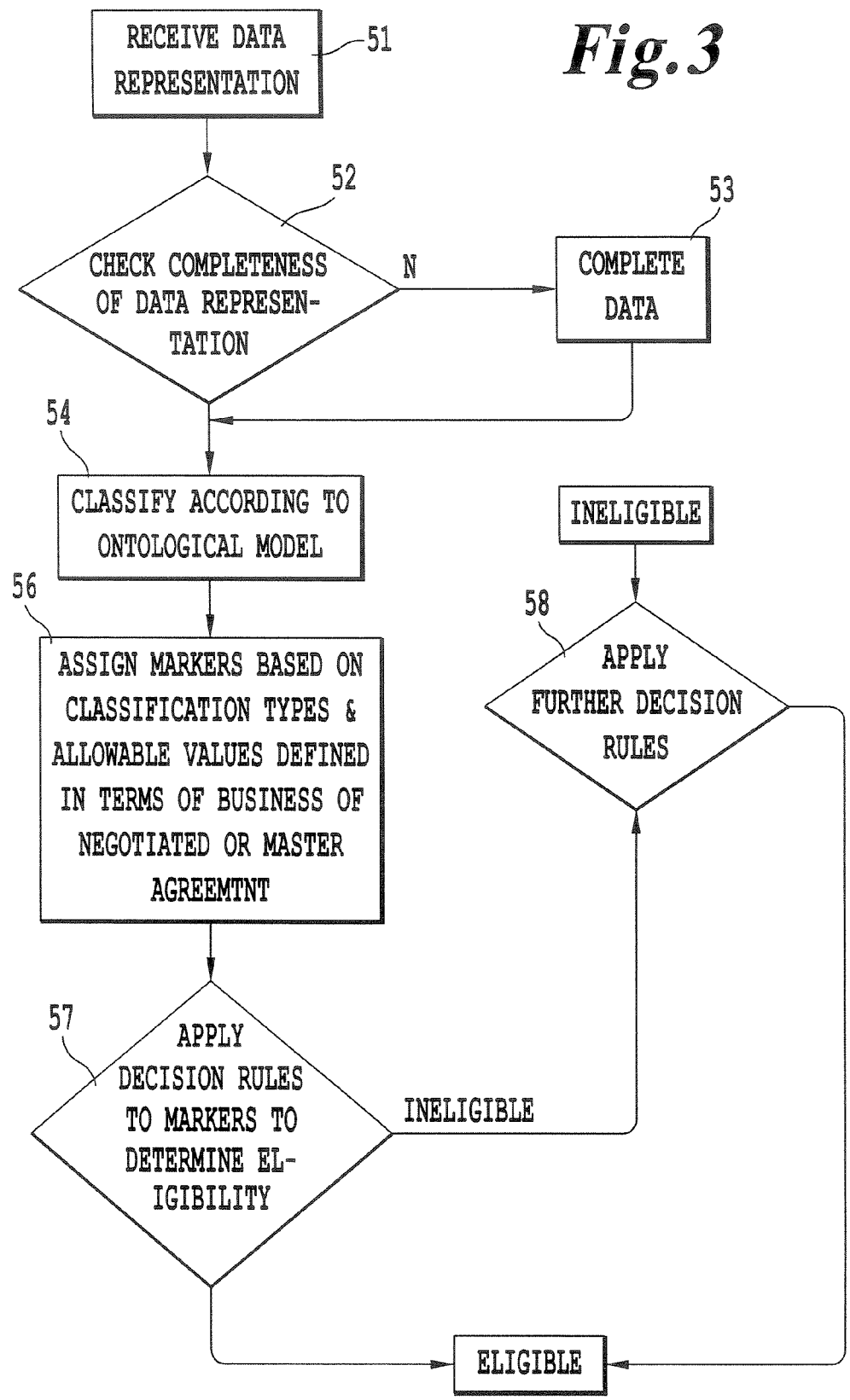
FIG. 3 is a high level flowchart of a process employed in an exemplary embodiment of the present invention.

FIG. 3 shows a high-level block diagram of an exemplary process according to the invention. The process generally described in FIG. 3 may represent a financial institution's method of determining whether to purchase any individual security such as a loan or a pool of loans, for example, a REMIC (real estate mortgage investment conduit). FIG. 3 describes the application of the inventive system, process or method to a home loan but is not intended to exclude other financial products or investments.

The flow of steps in FIG. 3 begins with receipt of a loan in the form of an electronic data representation via electronic media at a financial institution considering the purchase of the loan (51). The data representation may be used as received or may be optionally embellished with additional information provided by the financial institution, the seller of the loan, or another source such as a separate database from, for example, a third party which maintains a database of loan information that is not otherwise provided by the seller or purchaser of the loan. Thus, the data representation may first be checked to determine whether the data representation is complete or whether the date representation should be enriched (52). If the data representation is not complete or needs to be enriched, additional information and/or data may be added to the data representation. For example, the data representation may be enriched with data from a third party or the data representation may be enriched with preset data or other predetermined data to add any data that may be missing or is otherwise not part of the original data representation as received (53). The cumulative loan representation, enriched or used as received, may then be classified according to an ontological model (54) to provide one or more classification types.

Markers for each classification type are then assigned (56). A marker indicates whether the particular value for a classification type is within an allowable range or meets any threshold such as a range defined in the terms of business of a master or negotiated agreement. For example, in a case where a loan has a classification type "loan-to-value" (LTV), and the particular value for the loan is for example 95 (e.g., 95%), a marker acknowledging that the classification type is within the terms of business may be assigned. In one embodiment the marker is a Pass/Fail indicator only. In other embodiments the marker may function as an indicator that the loan should be handled differently or that the loan should be reviewed manually before a decision is made whether the loan should be purchased. Thus, instead of providing only a pass/fail indicator, the marker may, in one embodiment of the invention, provide an indication that the loan or security should be treated in a different manner.

After the classification types have been identified with the marker, a cumulative marker score may be calculated. The cumulative marker score may be compared against a decision rule or a set of decision rules in order to determine whether the loan or security is eligible for purchase (see 57 in FIG. 3). For example, in one embodiment each "pass" marker may be assigned a value of 1. When the average value of the cumulative marker score is less than 1, at least one of the classification types must have failed (i.e., because a "fail" contributes 0 to the cumulative marker score). The decision rule may be based on the average marker score and/or the ratio of pass to fail markers. Whether a particular score or ratio defines an eligible or ineligible status depends on the logic of the decision rule. The logic of the decision rule may be determined independently from the party carrying out the invention.

The criteria for assigning a marker may be provided in different forms. In one form, the criteria are provided as a set of allowable values. The set may be in the form of a master agreement or a negotiated agreement that may apply globally to all financial products or to only a portion of the financial products of any particular investor. For example, an investor may wish to accept loans for purchase only if the loans have a maturity term of no more than 15 years. An ontological model in turn may include a classification type that encompasses the maturity term. A loan having a classification type wherein the maturity term is 15 years or less would match with the allowable values of the master agreement or the negotiated agreement and therefore the marker for this classification type would be identified as "Pass." If this were the only classification type for the loan, the loan would necessarily be eligible for purchase.

A master agreement (e.g., Seller/Service Guide or "guide") or a negotiated agreement may provide a limit of acceptable values against which the classification types of the ontological model are judged, and thereby permits a financial institution to identify loans that meet the set of allowed values of the guide and are thus eligible for purchase. The set of criteria may be a set of business terms that contain one or more ranges of acceptable values for any and/or all of the classification types in a guide and may thereby apply globally to all securities and/or investment decisions made by an investor.

Because marker criteria are derived from the terms of business of a negotiated agreement and/or a master agreement, the classification types for a particular loan or security may be saved for future use. Thus, the previously characterized loan or security can quickly be checked for eligibility if the terms of business of the master agreement or negotiated agreement are changed, updated or otherwise flagged.

Classification types may also be defined according to the business strategy of the financial institution considering the purchase of a financial product, asset, or investment opportunity. For example, a financial institution may wish to purchase loans having only certain attributes, properties, and/or certain combinations of attributes which may be of particular interest, e.g., loans having high LTV and a long maturity term. The financial institution may identify loans having certain combinations of classification types (e.g., high LTV and long maturity) as eligible according to a preset value. Any loan from any seller of loans having the classification type combination "long term+high LTV" may be given a preset eligible rating or a preset flag to help identify such loans. In other embodiments, loans matching such special criteria may be defined as eligible and treated generically or may be identified, grouped and/or separated for special treatment.

As mentioned above, multiple agreements may be applicable for a given transaction. For example, in the case of home mortgage loan purchases by a financial institution (such as Freddie Mac), a "master agreement" known as a Seller/Servicer Guide governs transactions between the financial institution Mac and a plurality of lenders from whom it purchases loans. In addition, individual lenders who sell to the financial institution may enter into "negotiated agreements" that change, in some way, the terms of business contained in the master agreement. Accordingly, in order to accurately determine loan purchase eligibility from such lenders, terms of business contained in both the master agreement and the negotiated agreements would need to be considered. Both master and negotiated agreements define the allowable values of the data representation of a loan or classification type globally (e.g., provides preset loan characteristics). Examples of how a negotiated agreement may change the terms of business contained in a master agreement, include: (i) shorter time period of applicability, (ii) different qualifications requirements for loans, and (iii) different documentation requirements for loans.

Thus, a marker for a particular classification type may include (i) criteria from at least the financial institution considering purchase of a loan, (ii) the terms of business under which loan purchases are carried out with a particular loan reseller, (iii) minimum loan purchase requirements set by the financial institution or by a regulator or auditor of the financial institution, and/or (iv) the conditions of any negotiated agreements which may exist in a dynamic form and which may change over time.

FIG. 3 shows an optional decision step (58) that may be taken after it is determined that a loan is ineligible for purchase. In this aspect of the invention described in FIG. 3, the data representation and/or classification type is queried against any special secondary criteria that may correspond with a particular attribute or classification type of a loan representation, for example, the identity of the seller. The secondary criteria may be a set of additional data fields or may be a set of rules against which the data representation is judged independently of the classification type, negotiated agreement or master agreement. In one embodiment, the classification type is associated with secondary criteria that may be saved in memory. The attributes of the data representation, or the classification type may be judged with the secondary criteria (shown as (58) in FIG. 3). If the secondary criteria are not met, the data representation, i.e., the loan, may be judged ineligible for purchase (60).

FIG. 4 is a table of loan criteria that may be used as a basis for defining classification types. The Table of FIG. 4 is intended to represent only a partial list of the loan criteria that may be used in defining classification types.

Any of at least three actions may be taken once the data representation of a loan has been classified, the resulting classification types have been assigned markers, and the markers have been compared with a decision rule criterion including any one of a preset of criteria and/or the criteria associated with the terms of business of a negotiated agreement. If all of the markers allowably encompass the data representation of the loan, the preset criteria, or terms of business, then the loan may immediately be identified as one that is eligible for purchase. If one or more of the markers fails, the loan or security may be immediately rejected or it may be identified for further analysis. If the loan is ineligible, it is not eligible for purchase as an investment by the investor. If the loan is outside an allowable value by only a small amount, or if the terms of business indicate that a particular classification should not be used as the sole criterion for determining eligibility for purchase, then the loan may be identified for further analysis.

In some cases a financial institution may wish to identify and/or be particularly aware of certain loans, including loans offered by certain sellers. The loans may be, for example, identified by seller, or any other attribute that may be assigned to match a classification type of the ontological model. For example, a financial institution may wish to immediately halt the purchase of loans from a particular seller of loans or, alternatively, immediately accept all of such loans for purchase. If a classification type matches with such a decision criteria, e.g., a loan type has a seller or other attribute that is identified as not acceptable or, alternatively, exceptionally desirable; the data representation (e.g., loan) may be identified as ineligible or eligible for purchase by the financial institution depending on the particular circumstances.

As shown in FIG. 3, after the determination of eligibility (or concurrently therewith), the data representation may be matched with the terms of business, conditions of a negotiated agreement, loan type, or other information to provide an audit trail for the decision purchase (61).

Conditions of business (e.g., terms of business) that may be a part of a negotiated agreement with a reseller or third party, and in some cases a part of master agreements, are often in the form of textual contract provisions that may not be easy to represent as a set of criteria. In one aspect of the invention the terms of business are coded to certain preset contract provisions. The contract provisions may be the allowable threshold values and/or allowable ranges for the data fields of a data representation. The terms of business may be part of a collection of terms of business that can be easily coded and inserted into new and/or amended negotiated agreements in a cut and paste manner. Thus, in one aspect of the invention, the process includes preparing a negotiated agreement wherein the terms of business in the negotiated agreement are coded to certain acceptable values and/or ranges for particular components and/or classification types of a loan.

The invention also includes an embodiment wherein the decision rules and any of the classification types, criteria, analysis thresholds, terms of business, negotiated agreements, are associated with the data representation during or after the classifying, assigning and rules application of the invention are carried out. By associating, for example, the terms of business with each security considered for purchase, a financial institution is provided with a basis from which to audit any security purchases or sales which are or were a part of the financial institution's assets. In conventional processes, in contrast to certain embodiments of the invention, when a loan is rejected, neither the reason the loan was rejected nor the criteria for determining whether to accept the loan is available for audit analysis.

In this embodiment, once the classification types, preset criteria and/or terms of business of a negotiated agreement, etc. for a particular investment decision have been identified, the criteria used to determine eligibility for purchase may be associated with a record of the security. Thus, the data representation of the loan may be updated, enriched or modified to include the set of allowable values (e.g., special criteria) for each classification type used to make the eligibility decision.

By associating the eligibility criteria with the loan, any particular loan may be audited later to determine the basis from which an eligibility decision was made. This embodiment of the invention provides a further advantage to the method of the invention. In conventional processes, once a purchase decision has been made, the security is either purchased or rejected as ineligible. Little or no information regarding the basis for the decision is saved or associated with the security in the form of the security's data representation. Conventionally, if the security is purchased and is later found to be unprofitable, it is not possible to audit or trace back through the decision process to determine which eligibility criteria were used to permit purchase of the security. The invention process on the other hand may include a step of matching the eligibility criteria with the data representation of the security. Thus, in an embodiment of the method of the invention, at any point before or after a decision has been made to participate in or decline a particular investment, the decision may be audited by reviewing the eligibility criteria against the classification types.

Figure 5:
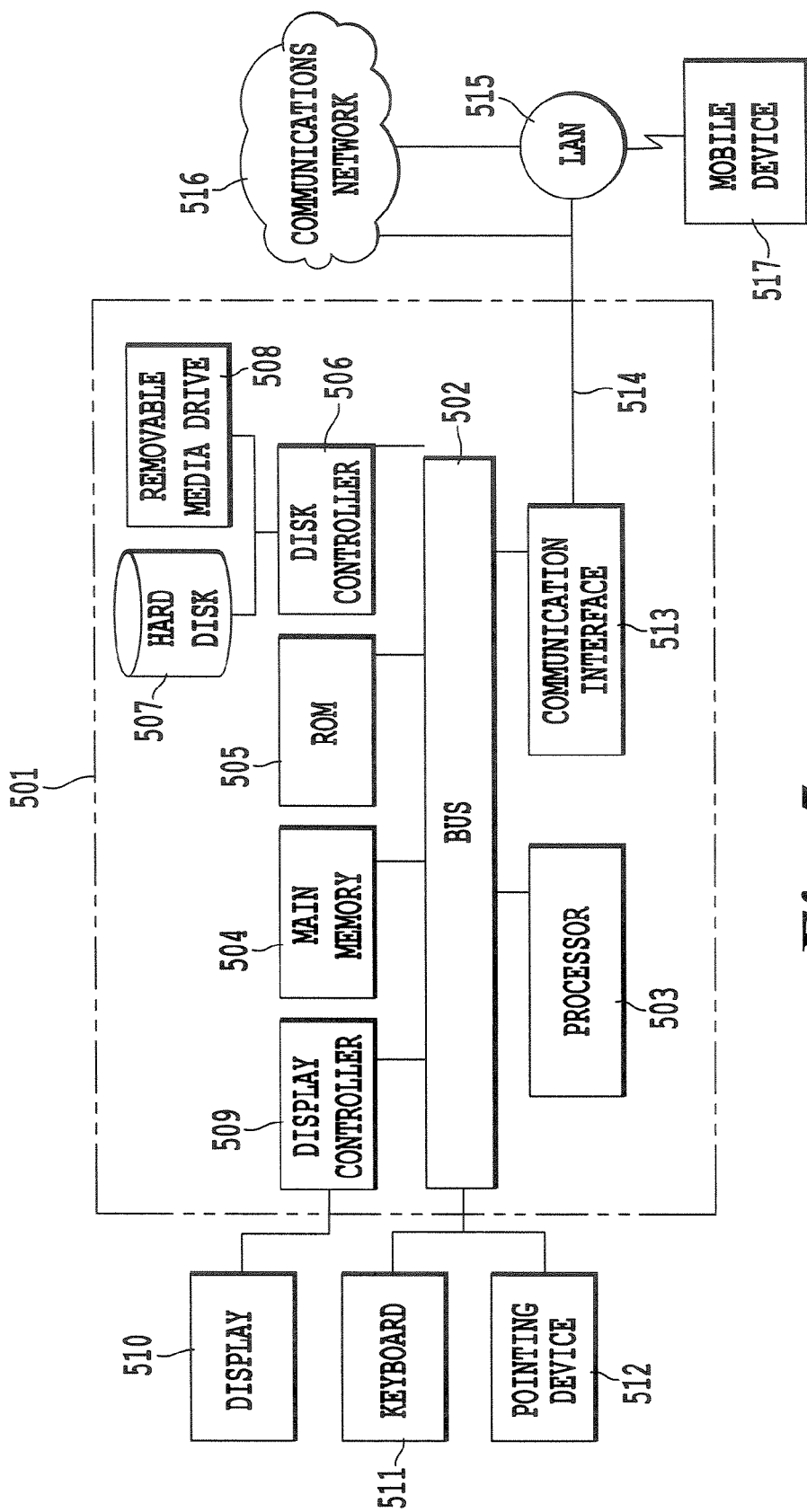
FIG. 5 is an exemplary computer system and information distribution environment on which the invention may be carried out.

The embodiments of the invention discussed above may be carried out on a computer system. Different aspects of a computer system upon which the invention may be carried out are described below and in FIG. 5. FIG. 5 illustrates a computer system 501 upon which an embodiment of the present invention may be implemented. The computer system 501 includes a bus 502 or other communication mechanism for communicating information, and a processor 503 coupled with the bus 502 for processing the information. The computer system 501 also includes a main memory 504, such as a random access memory (RAM) or other dynamic storage device (e.g., dynamic RAM (DRAM), static RAM (SRAM), and synchronous DRAM (SDRAM)), coupled to the bus 502 for storing information and instructions to be executed by processor 503. In addition, the main memory 504 may be used for storing temporary variables or other intermediate information during the execution of instructions by the processor 503. The computer system 501 further includes a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 also includes a disk controller 506 coupled to the bus 502 to control one or more storage devices for storing information and instructions, such as a magnetic hard disk 507, and a removable media drive 508 (e.g., floppy disk drive, read only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 502 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 501 may also include a display controller 509 coupled to the bus 502 to control a display 510, such as a cathode ray tube (CRT), for displaying information to a computer user. The computer system includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing steps of the invention in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMS (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read. Stored on any one or on a combination of computer readable media, the present invention includes software for controlling the computer system 501, for driving a device or devices for implementing the invention, and for enabling the computer system 501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 503 for execution. A computer readable medium may take many forms, including but not limited to, non-volatile media, volatile media, and transmission media. Non-volatile media includes, for example, optical, magnetic disks, and magneto-optical disks, such as the hard disk 507 or the removable media drive 508. Volatile media includes dynamic memory, such as the main memory 504. Transmission media includes coaxial cables, copper wire and fiber optics, including the wires that make up the bus 502. Transmission media also may also take the form of acoustic or light waves, such as those generated during radio wave and infrared data communications.

Various forms of computer readable media may be involved in carrying out one or more sequences of one or more instructions to processor 503 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 501 may receive the data on the telephone line and use an infrared transmitter to convert the data to an infrared signal. An infrared detector coupled to the bus 502 can receive the data carried in the infrared signal and place the data on the bus 502. The bus 502 carries the data to the main memory 504, from which the processor 503 retrieves and executes the instructions. The instructions received by the main memory 504 may optionally be stored on storage device 507 or 508 either before or after execution by processor 503.

The computer system 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a network interface card to attach to any packet switched LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc). The signals through the various networks and the signals on the network link 514 and through the communication interface 513, which carry the digital data to and from the computer system 501 may be implemented in base signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

The invention claimed is:

1. A method for determining the purchase eligibility of a financial product such as a loan, the method implemented by a financial product processing device, the method comprising:
   electronically receiving in a processor of the financial product processing device a data representation of the loan, said data representation containing a plurality of attributes;
   electronically classifying in the processor of the financial product processing device the data representation of the loan according to an ontological model into one or more classification types, wherein the ontological model represents a hierarchical organization of a plurality of classification types and each classification type corresponds to one or more of the attributes of the data representation and represents a term of business in a master agreement or a negotiated agreement;
   electronically assigning in the processor of the financial product processing device a marker to each of the identified classification types, wherein each marker indicates whether the loan meets an allowed value or range corresponding to the attributes represented by the classification type, the allowed value or range being defined in the master agreement or the negotiated agreement;
   electronically applying one or more decision rules in the processor of the financial product processing device, each having at least one condition to the assigned markers to identify the loan as eligible for purchase when the markers meet the conditions of the decision rules; and
   associating and storing the classification types, terms of business associated with an investment decision for the loan, and criteria used to determine eligibility or ineligibility for the loan, with a record of the loan.

2. The method of claim 1, further comprising the step of:
   electronically identifying a loan as eligible for purchase when the markers meet the conditions of the decision rules.

3. The method of claim 1, further comprising the step of:
   electronically associating, with the loan, the terms of business of a master agreement or a negotiated agreement with which the attributes of the loan were compared.

4. The method of claim 1, further comprising the step of:
   electronically marking the loan as ineligible for purchase when the markers do not meet the conditions of the decisions rules.

5. The method of claim 4, further comprising the step of:
   electronically comparing the classification type or attributes of the loan with a secondary set of criteria for an ineligible loan type.

6. The method of claim 1, further comprising the step of:
   electronically comparing the eligible loan with one or more additional criteria.

7. The method of claim 6, wherein the additional criteria are not a component of the data representation, attributes or the classification type of the eligible loan.

8. The method of claim 1, wherein the classification types include a bond, an asset-backed security, and an unsecured loan.

9. The method of claim 1, wherein the plurality of attributes include a loan to value ratio and mortgage insurance.

10. The method of claim 1, wherein after the data representation of the loan is received, the financial product processing device checks whether the data representation is complete, and if it is determined that the data representation is incomplete, additional information may be added to the data representation.

11. The method of claim 10, wherein when it is determined that the data representation is incomplete, preset data is provided for data that was missing from the data representation.

12. The method of claim 1, wherein the marker is a pass/fail indicator.

13. The method of claim 1, wherein the marker indicates that the financial product should be reviewed manually before a decision is made whether the financial product should be purchased.

14. The method of claim 1, wherein the classification types for a particular loan or security are saved for future use, and the stored classification types can be modified based on modifications to the terms of business in the master agreement or the negotiated agreement.

15. The method of claim 1, further comprising electronically tracing through the decision process to determine which eligibility criteria were used to determine the loan as eligible.

16. A non-transitory computer-readable medium having computer-readable instructions that when executed by a computer cause the computer to perform a method for determining the eligibility for purchase of a financial product such as a loan, comprising the steps of:
- receiving a data representation of the loan, said data representation containing a plurality of attributes;
- classifying the data representation of the loan according to an ontological model into one or more classification types, wherein the ontological model represents a hierarchical organization of a plurality of classification types and each classification type corresponds to one or more of the attributes of the data representation and represents a term of business in a master agreement or a negotiated agreement;
- assigning a marker to each of the identified classification types, wherein each marker indicates whether the loan meets an allowed value or range corresponding to the attributes represented by the classification type, the allowed value or range being defined in the master agreement or the negotiated agreement;
- applying one or more decision rules, each having at least one condition to the assigned markers to identify the loan as eligible for purchase when the markers meet the conditions of the decision rules; and
- associating and storing the classification types, terms of business associated with an investment decision for the loan, and criteria used to determine eligibility or ineligibility for the loan, with a record of the loan.

17. A system for implementing a method for determining the eligibility for purchase of a financial product such as a loan, comprising:
- a receiving unit configured to receive a data representation of the loan, said data representation containing a plurality of attributes;
- a classifying unit configured to classify the data representation of the loan according to an ontological model into one or more classification types, wherein the ontological model represents a hierarchical organization of a plurality of classification types and each classification type corresponds to one or more of the attributes of the data representation and represents a term of business in a master agreement or a negotiated agreement;
- an assigning unit configured to assign a marker to each of the identified classification types, wherein each marker indicates whether the loan meets an allowed value or range corresponding to the attributes represented by the classification type, the allowed value or range being defined in the master agreement or the negotiated agreement;
- an applying unit configured to apply, via a processor, one or more decision rules, each having at least one condition to the assigned markers to identify the loan as eligible for purchase when the markers meet the conditions of the decision rules; and
- a non-transitory storage device configured to associate and store the classification types, terms of business associated with an investment decision for the loan, and criteria used to determine eligibility or ineligibility for the loan, with a record of the loan.

* * * * *